(12) United States Patent
Jerding et al.

(10) Patent No.: US 7,308,697 B1
(45) Date of Patent: Dec. 11, 2007

(54) SYSTEMS AND METHODS FOR MULTIMEDIA MESSAGING IN A CABLE OR SATELLITE SUBSCRIBER SYSTEM

(75) Inventors: Dean F. Jerding, Roswell, GA (US); Robert O. Banker, Cumming, GA (US); Azita M. Manson, Duluth, GA (US); Timothy H. Addington, Roswell, GA (US); Arturo A. Rodriguez, Norcross, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/480,011

(22) Filed: Jan. 10, 2000

Related U.S. Application Data (60) Provisional application No. 60/143,835, filed on Jul. 14, 1999.

(51) Int. Cl.
*H04N 7/10* (2006.01)
(52) U.S. Cl. .......................... 725/34; 725/33; 725/116
(58) Field of Classification Search ................. 725/32, 725/33, 34, 35, 36, 116
See application file for complete search history.

(56) References Cited

U.S. PATENT DOCUMENTS

| | | | |
|---|---|---|---|
| 5,600,573 A | * | 2/1997 | Hendricks et al. ........... 725/109 |
| 5,659,350 A | * | 8/1997 | Hendricks et al. ........... 725/116 |
| 5,771,064 A | * | 6/1998 | Lett .............................. 725/134 |
| 5,822,123 A | * | 10/1998 | Davis et al. ................... 725/43 |
| 5,872,926 A | | 2/1999 | Levac et al. |

FOREIGN PATENT DOCUMENTS

| | | |
|---|---|---|
| EP | 0 788 065 A2 | 8/1997 |
| EP | 0 825 752 A2 | 2/1998 |
| WO | WO 97/34410 | 9/1997 |

OTHER PUBLICATIONS

IEEE 100, The Authoritative Dictionary of IEEE Standard Terms, Seventh Edition, pp. i, 508.*

* cited by examiner

*Primary Examiner*—Scott E. Beliveau
*Assistant Examiner*—James Sheleheda (57) ABSTRACT

The present invention comprises customizable, multimedia messaging over a subscriber television system, such as a cable or satellite system, utilizing a service independent framework. The present invention comprises a multimedia messaging (MMM) server generally located at a headend of a cable or satellite system, and an MMM client at a communications terminal located remotely with respect to the MMM server. A service provider or operator defines a message configuration that is utilized to present the message content to one or more subscribers. The message configuration includes parameters that control the presentation of the message content. The MMM server receives an MMM request from a service application, and in response thereto, generates an MMM request which is sent to the communications terminal, and more particularly, to the MMM client. The MMM client processes the MMM request, including the retrieval of any message content or the message configuration. The MMM client then presents the message to the subscriber. Since the MMM server and MMM client are platform independent, any number of different services may send uniquely generated and uniquely designed messages for presentation to a subscriber(s).

4 Claims, 6 Drawing Sheets

Set Up MMM Configuration

- Name:
- Last Modified:
- Category: Emergency Alert System
- Message Type:
- Relative Path:
- Description:

Tabs: Urgency Type | Force Tune Type | Message Time | Alert Type | Display Type | Display Size Message Time
- Duration: ___ seconds
- Repeats: ___
- Delay Between Repeats: ___ seconds
- Expiration Date/Time: MM/DD  HH:MM:SS  AM

[Save]  [Cancel]  [Help]

Fig. 2D

Set Up MMM Configuration

- Name:
- Last Modified:
- Category: Emergency Alert System
- Message Type:
- Relative Path:
- Description:

Tabs: Urgency Type | Force Tune Type | Message Time | Alert Type | Display Type | Display Size Alert Type
- Message Alert: ○ None   ○ Text   ○ HTML
  ○ LED    ○ Text & LED   ○ HTML & LED
- Alert Text: ___
- Alert LED Rate: ___ cycles/second
- Alert LED Duration: ___ seconds
- Alert LED Period: ___ seconds

[Save]  [Cancel]  [Help]

Fig. 4

SYSTEMS AND METHODS FOR MULTIMEDIA MESSAGING IN A CABLE OR SATELLITE SUBSCRIBER SYSTEM

RELATED APPLICATIONS

This applications claims priority to U.S. Provisional Application No. 60/143,835, entitled "Framework, Mechanism, and User-Interface for Multimedia Messaging in a Cable or Satellite Subscriber Network," filed Jul. 14, 1999.

FIELD OF THE INVENTION

The present invention generally relates to a subscriber television system, such as cable and satellite subscriber systems, and more particularly, to multimedia messaging in such systems.

BACKGROUND OF THE INVENTION

The number of households receiving cable or satellite subscriber services continues to increase year to year. This trend is expected to continue, especially with the recent advent of digital television. Digital television systems enable two-way and advanced one-way communications between the subscriber and the system headend. As a consequence, interactive services such as e-mail, interactive programming guides, advanced configuration controls, impulse pay-per-view, video-on-demand, e-commerce, and web browsing may be provided to subscribers of a digital television system. In addition to the interactive services, the increased bandwidth available through a digital television system has made it possible for the subscriber to have access to hundreds, or even thousands, of channels and/or services. Further, the increased bandwidth enables services such as virtual or text channels to become more complex as they may be enhanced by graphical images, audio, and other multimedia content. New multimedia services such as Emergency Alert System (EAS) notifications, e-mail, messaging from operator-to-user or user-to-user also become possible.

While advancements in certain technologies have expanded the complexity and type of services that can be provided over cable and satellite systems, there are still constraints within these systems that may limit the utilization of these emerging technologies. For instance, the non-functional requirements regarding performance and memory consumption are generally viewed as limiting factors in the design and implementation of new services which take advantage of these new technological advancements.

For example, a set-top box, also referred to as a home communication terminal (HCT), is located at a user site for connecting to and interfacing with a subscriber television system, such as a cable or satellite system. For purposes of the present disclosure, set-top boxes, HCT's and other similar devices are collectively referred to herein as communication terminals. Most communication terminals are typically designed to meet the minimum specifications for providing a certain level of functionality. Some of the more common limitations are the amount of volatile memory (e.g., random access memory), the amount of non-volatile memory (e.g., NVRAM and the hard disk), and the performance of the processor (e.g., the processor clock speed and design). These limitations are generally governed by the per unit cost of a communication terminal which is preferably kept low in order to be as competitive as possible. Thus, it is desirable to conserve and reuse certain functionality whenever practical within the architecture of the cable or satellite system, and in particular, at the communication terminal.

In addition, the development of new services is costly, and therefore, the sharing of functionality between services that are executed at the communication terminal and/or the headend may not only reduce the associated overhead in terms of memory, processor time and bandwidth, but may reduce the software development cost as well. Yet further, the management of the user interface at the communication terminal has generally become much more complex as multiple program services compete for presentation to the user.

Many of the new multimedia services, as well as existing services, provide for messaging, such as text presented by a virtual or text channel, a tuned channel, or as part of emergency services such as EAS notifications. Other types of messaging within a cable or satellite system may include service provider-to-user or user-to-user messaging. However, current services typically perform these messaging functions independent of one another. As a result, resources such as processing power, bandwidth, and software development time and cost may be unnecessarily expended if multiple services are performing essentially the same messaging functions in parallel over the same television system.

Therefore, an unsatisfied need exists in the industry for more efficient utilization of resources in development and implementation of messaging in cable and satellite systems.

SUMMARY OF THE INVENTION

The present invention provides for customizable, multimedia messaging over a subscriber television system utilizing a service independent framework. The present invention comprises a multimedia messaging (MMM) server generally located at a headend of a cable or satellite system, and an MMM client at a communication terminal located remotely with respect to the MMM server. Service providers and operators of the cable or satellite system can define a message configuration that is utilized to present message content to a subscriber. The message configuration includes parameters which control the presentation of the message content. The message configuration is application independent so as to be compatible with multiple services provided by the cable or satellite system. For instance, services such as Emergency Alert System (EAS), HTML-based virtual channels, or subscriber messaging can generate and present multimedia messages to users in a predefined format such as a scrolling ticker-tape, banner, pop-up window, full screen HTML-formatted text and images, or pop-up ticker with an associated audio message. The message configuration also is extendible to support parameters for virtually any content format.

Accordingly, the present invention advantageously enables multiple services to define message configurations and generate multimedia messages based on the message configurations for delivery to a user(s) utilizing a common MMM server. The MMM server efficiently delivers the message content and the message configuration typically in the form of an MMM request to one or more MMM clients. The MMM requests can be individual addressed or broadcast to the MMM clients, or the requests can be pre-defined services assigned to channels and triggered by the resident navigation application on the communications terminal when the terminal user tunes to the channel. Further, the MMM requests do not necessarily include the message configuration or the message content of the multimedia message, thereby conserving system bandwidth. The MMM request may include one or more location references that can be utilized to retrieve either or both of the message configuration and message content for execution of the MMM request by the MMM client. The sharing of the multimedia messaging functionality of a common MMM server by multiple services reduces the software development efforts of the various services since they do not have to include client/server software for messaging. Further, the system requirements at the communication terminal are reduced because only a single MMM client is needed for presentation of multimedia messages from multiple services, as opposed to client software for each service.

In accordance with an aspect of the present invention, a method for providing customizable multimedia messages over a television system to a communications terminal for presentation to a user comprises creating a message configuration, and creating an MMM request to a communications terminal for presenting message content to a user according to the message configuration, wherein the MMM request includes the message content and a message configuration expression. The MMM request is sent to the communications terminal over the television system where the message content is presented to the user. The step of creating the MMM request may include a step of including a message configuration expression which comprises the message configuration. Thus, the message content and the message configuration are sent together to the communication terminal as a part of the MMM request. Alternatively, the step of creating an MMM request may include a step of including a message configuration expression which comprises a location reference to the message configuration. Thus, the communication terminal then retrieves the message configuration utilizing the location reference, either from local memory or from another location within the television system. It is also within the scope of the present invention to have the message configuration delivered to the communication terminal from a remote location at the initialization or boot of the communication terminal.

In accordance with another aspect of the present invention, a method for receiving customizable multimedia messages over a television system at a communication terminal for presentation to a user comprises receiving an MMM request at the communication terminal for presenting message content to a subscriber according to a message configuration, wherein the MMM request includes the message content and a message configuration expression. The message content is presented to the user according to the message configuration by the communications terminal. The method may further comprise retrieving the message configuration from a remote location utilizing the message configuration expression, wherein the message configuration expression comprises a location reference. Alternatively, the message configuration expression may comprise the message configuration, and thus is made available with the MMM request. In addition, the message configuration may be retrieved locally from a memory location in the communications terminal as identifiable by the message configuration expression.

In accordance with yet another aspect of the present invention, a system for providing customizable multimedia messages over a television system to a communications terminal for presentation to a user comprises a multimedia messaging (MMM) server that receives a message configuration and associated message content for presentation to a user according to the message configuration, and generates an MMM request including the message content and a message configuration expression for delivery over the television system to a communications terminal associated with the user. The system further may comprise an MMM client that receives the MMM request and associates the message content and the message configuration for presentation of the message content to the user according to the message configuration. The message configuration expression may comprise a location reference that can be utilized by the MMM client to retrieve the message configuration for use in presenting the message content. Alternatively, the message configuration expression may comprise the message configuration, and thus, the message content and the message configuration may be provided with the MMM request. The system may further comprise a database of message configurations, which is accessible by the multimedia server. The MMM client may include a client application and a configuration manager, wherein the configuration manager generally provides the client application with the message configuration associated with a message content. The MMM client may also include a message database whereby the MMM client records MMM requests that are received. An interface on the communications terminal can make this information available to other services as well as to the user of the terminal via a Graphical User Interface.

In accordance with yet another aspect of the present invention, a system for delivery of multimedia messages comprises an MMM server, a configuration database of predefined message configurations that are accessible by the MMM server, and at least one service server that generates message content and delivers the message content to the MMM server. In response thereto, the MMM server generates an MMM request that comprises the message content and a message configuration expression. In one embodiment, the service server may be an Emergency Alert System. The message configuration expression may comprise a location reference that can be utilized to retrieve the message configuration, or alternatively, may comprise the message configuration.

Other features and advantages of the present invention will become apparent to one skilled in the art upon examination of the following drawings and detailed description. It is intended that all such features and advantages be included herein within the scope of the present invention as defined by the appended claims.

BRIEF DESCRIPTION OF THE DRAWINGS

The present invention can be better understood with reference to the following drawings. The elements of the drawings are not necessarily drawn to scale, emphasis instead being placed upon clearly illustrated principles of the present invention. Furthermore, like reference numerals designate corresponding parts throughout the several views.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
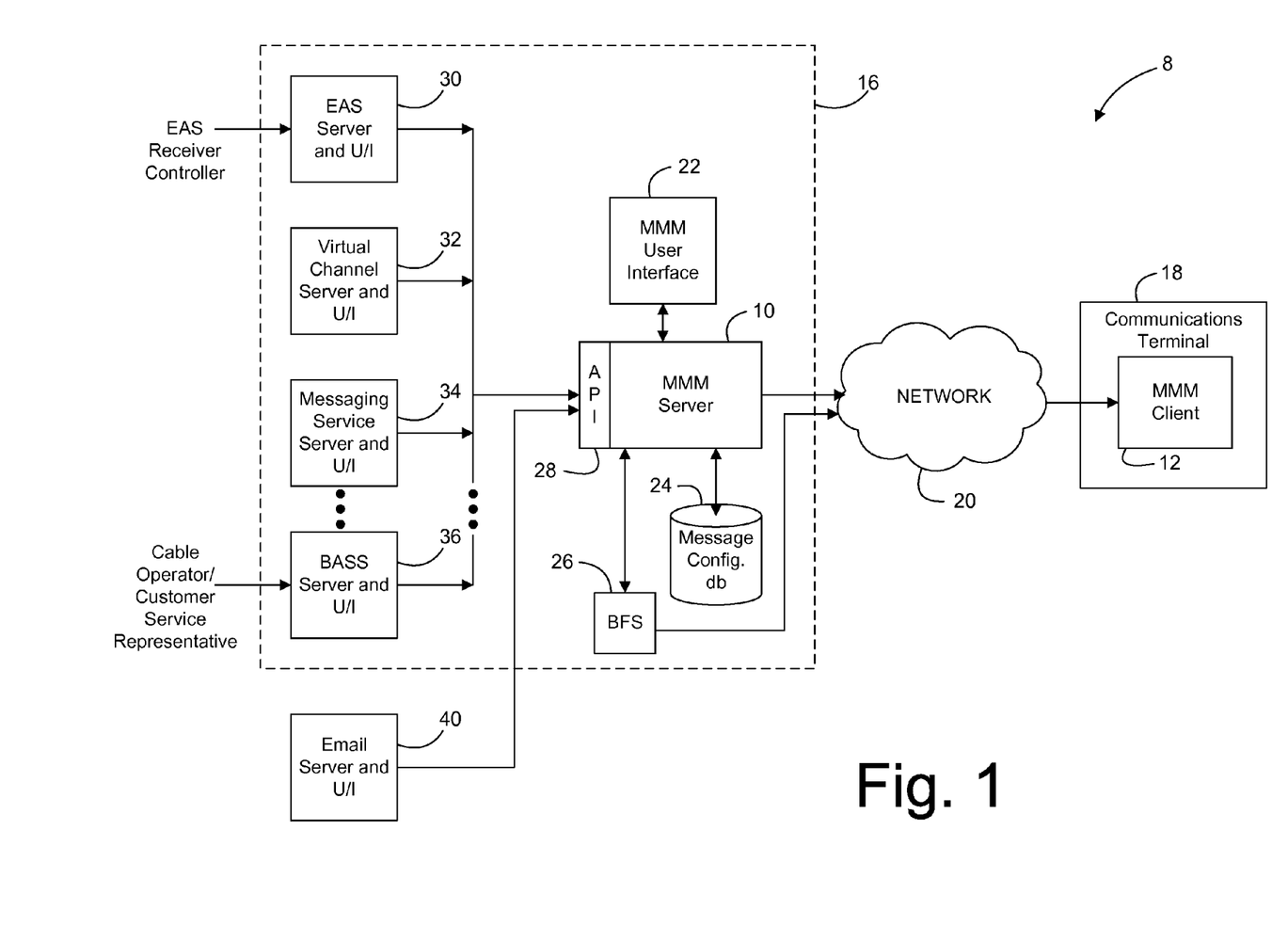
FIG. 1 is a block diagram of a multimedia messaging system in accordance with an embodiment of the present invention.

With reference to FIG. 1, a television system 8 comprises a multimedia messaging (MMM) server 10 and an MMM client 12 in accordance with an embodiment at present invention. The television system 8 may be a cable or satellite television system as are well known in the industry. The television system 8 comprises a headend 16, a communications terminal 18, and a network 20 interconnecting the headend 16 and the communications terminal 18. The network 20 may comprise any suitable transmission medium for establishing one-way and/or two-way communications between the headend 16 and the communications terminal 18. For example, the network 20 may comprise a hybrid fiber/coax network or a satellite-based network, both of which are well known in the industry.

At the headend 16, the MMM server 10 is connected to an MMM user interface 22 and a message configuration database 24. In addition, the MMM server 10 is connected to a broadcast file system (BFS) 26 which delivers various types of data from various servers, preferably located at the headend 16, to one or more communications terminals 18 via network 20. A detailed disclosure of a BFS suitable for implementation as BSF 26 can be found in at least U.S. patent application Ser. No. 09/319,844, entitled "Using A Hierarchical File System for Indexing Data Broadcast to a Client from a Network of Servers," and filed Dec. 12, 1997, the disclosure of which is incorporated herein by reference as is set forth in full. While the MMM server and the associated system elements are illustrated as being located at the headend 16, it will be appreciated that the MMM server 10 and the other system elements do not have to be located at a headend 16, but can be remotely located with respect to the headend 16 and/or with respect to one another.

One or more service application servers are interfaced with the MMM server 10 through an MMM server API (Application Program Interface) 28, which preferably is based on common object request broker architecture (CORBA). For instance, as illustrated in FIG. 1, resident service application servers include an emergency alert system (EAS) server and user interface 30, a virtual channel server and user interface 32, a messaging service server and user interface 34, and a business application support system (BASS) server and user interface 36. In addition, one or more remote service application servers such as an e-mail server and user interface 40 may likewise be interfaced with the MMM server 10. Other services that may be provided by the television system 8 and that may make use of the multimedia messaging of the present invention include, but are not limited to, billing, stocks, or shopping.

In accordance with the present invention, the separate service application servers can utilize the functionality provided by the MMM server 10 and MMM client 12 to create, send and display multimedia messages to a communications terminals 18 for presentation to a subscriber, thereby reducing the overhead associated with each service having messaging client software at the communications terminal 18. A service can create a message configuration which defines how the message content is presented to the subscribers. The parameters are general enough to support messaging from many different services, such as those provided by the illustrative service application servers depicted in FIG. 1, including EAS notifications from the EAS server 30, HTML-based virtual channels from the virtual channel server 32, subscriber messages from the messaging server 34 and e-mail from the e-mail server 34. A service may submit a request to the MMM server 10 to have specified content presented to a single group or entire population of subscribers according to a specified (or default) message configuration. In response, the MMM server 10 generates an MMM request that is sent to the appropriate communications terminal(s) 18. The MMM request includes the message content (or a reference thereto) and the message configuration (or a reference thereto). The MMM client 12 process the MMM request, and presents the message content to the user according to the message configuration. Thus, the MMM server 10 and the MMM client 12 provide for application independent messaging by a plurality of services, eliminating the duplication of functions, reducing system complexity and cost, and making more efficient use of system bandwidth.

In accordance with the present embodiment of the invention, the television system 8 may include a service management platform such as that described in U.S. patent application Ser. Nos. 09/025,577, entitled "System and Method for Providing a Full Service Television System," filed Feb. 18, 1998, and 09/071,550, entitled "System and Method for Providing a Plurality of Programming Services in a Television System," filed May 1, 1998, the disclosures of which are incorporated by reference. This allows the separate service application servers to create MMM requests and have them defined as services available to the communications terminal user via the navigation framework provided by the terminal's resident service navigator application. Typically this framework involves access to the services via a channel number. In this embodiment, a user of the communications terminal 18 may tune the communications terminal to such a channel which results in the MMM client receiving the pre-defined MMM request already stored in local memory on the terminal.

Examples of the various types of visual content and audio content that may be delivered by the MMM server 10 include a ticker, banner, sprite, barker, animated clip, LED illumination, etc. Examples of specific configuration of the content may include the following: a ticker-taped message scrolling across a portion of a display device associated with the communications terminal 18 with accompanying audio alerting the viewer of severe weather (e.g., a tornado warning); a banner message that pops up in a portion of the display device and including a graphic image and a flashing LED on the communications terminal's front panel alerting the user of e-mail; a pop-up window in the center of the display device telling the user to pay a bill; pages of full-screen HTML formatted text and images displayed on custom background informing the user of upcoming specials on pay-per-view movies; pages of full-screen HTML formatted text with images and accompanying audio instructing the user on how to use various services available on the communications terminal 18; and a pop-up ticker on a portion of a display device with an accompanying prerecorded message from another user. Further, the architecture of the MMM framework is such that it can be easily extended to support additional configuration parameters, such as new alerts and display parameters. For example, future developments in HTML, animated image icons, picture-in-picture display modes, and streaming audio may be incorporated into the framework of the present invention.

In accordance with an aspect of the present invention, an MMM configuration comprises a plurality of parameters which are interpreted by the MMM client 12 for defining the various aspects of how the message content is presented to a subscriber. For example, MMM configuration parameters may determine the priority of a message, how the message is triggered, whether or not a channel is forced tuned, how the subscriber is alerted of the message, the size of the message, location of the message on the screen display device, the animation of the visual display, how the subscriber may interact with a visual display, the sale of the scroll, visual appearance, volume level, relative site of message or a display device, the viewing time, the viewing order, and how often the message is repeated, etc. In an embodiment of the present invention, an MMM configuration can be created by an operator of a service application servers and associated user interfaces 30, 32, 34, 36, 40, or alternatively, at the MMM user interface 22. The MMM configuration parameters may be defined, for example, by the originating service or the operator of the MMM server 10, set as default based on the message type and/or priority, or by the user of the communications terminal via use configurable parameters. Further, some of the parameters may be set with default values, may be set or overridden by the MMM request or by the profile of the MMM client user.

Figure 2A:
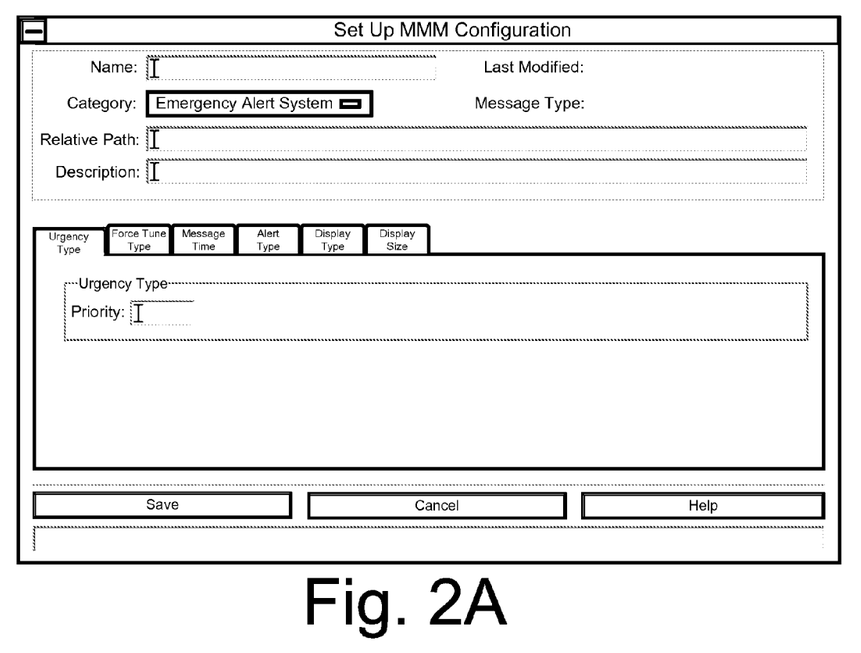
FIGS. 2A-2F are illustrative screen displays that show user interfaces suitable for creation of a multimedia messaging configuration in accordance with an embodiment of the present invention.
Figure 2B:
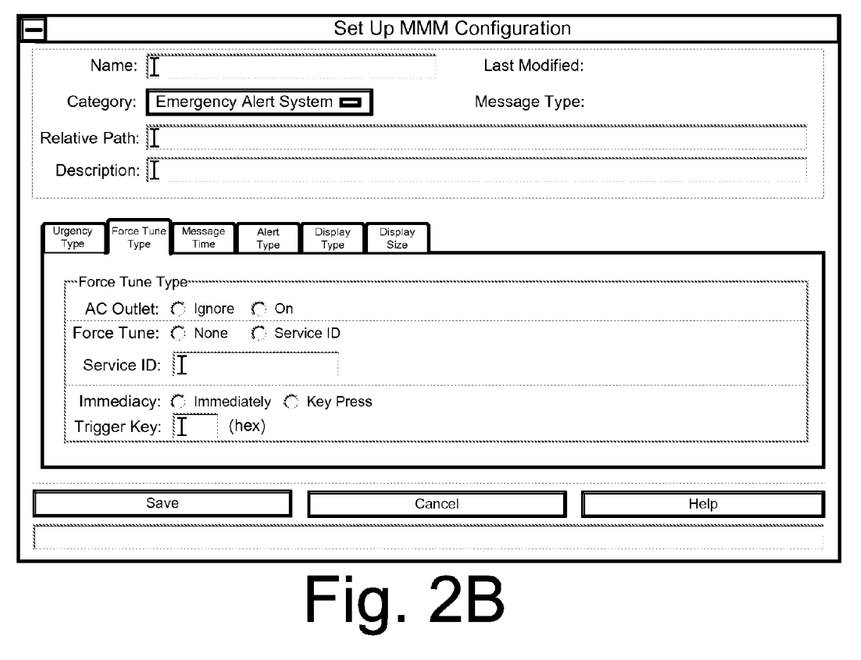
Figure 2C:
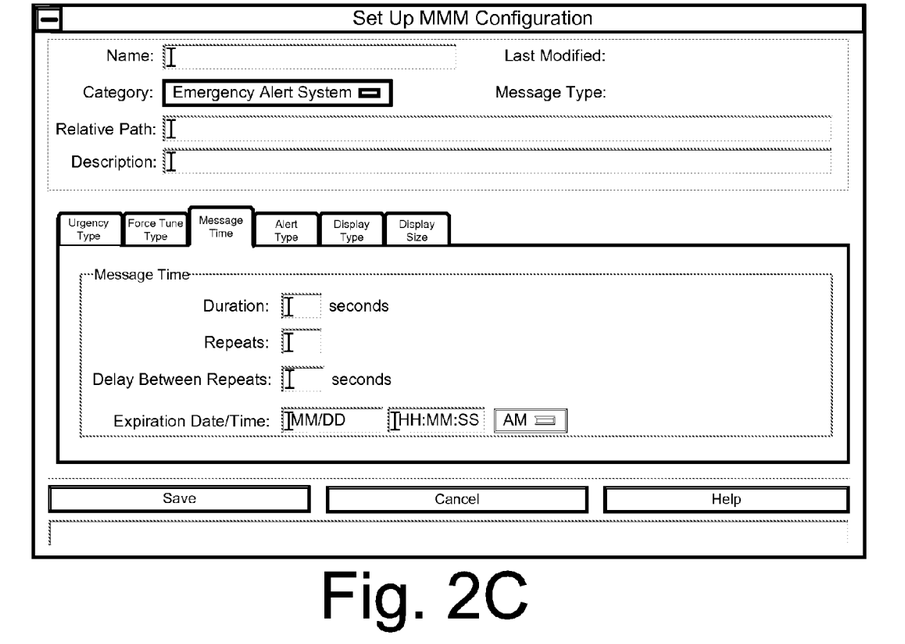
Figure 2D:
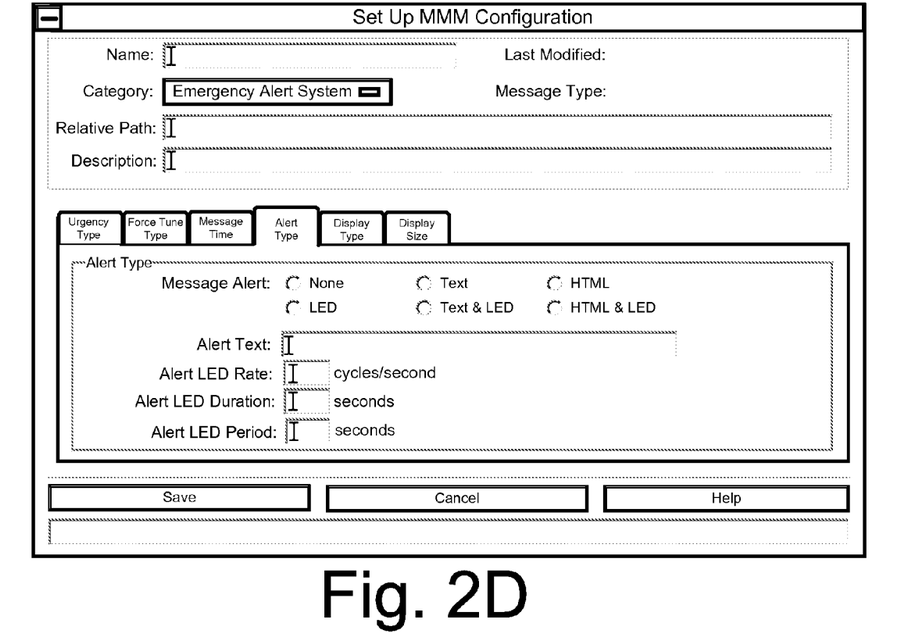
Figure 2E:
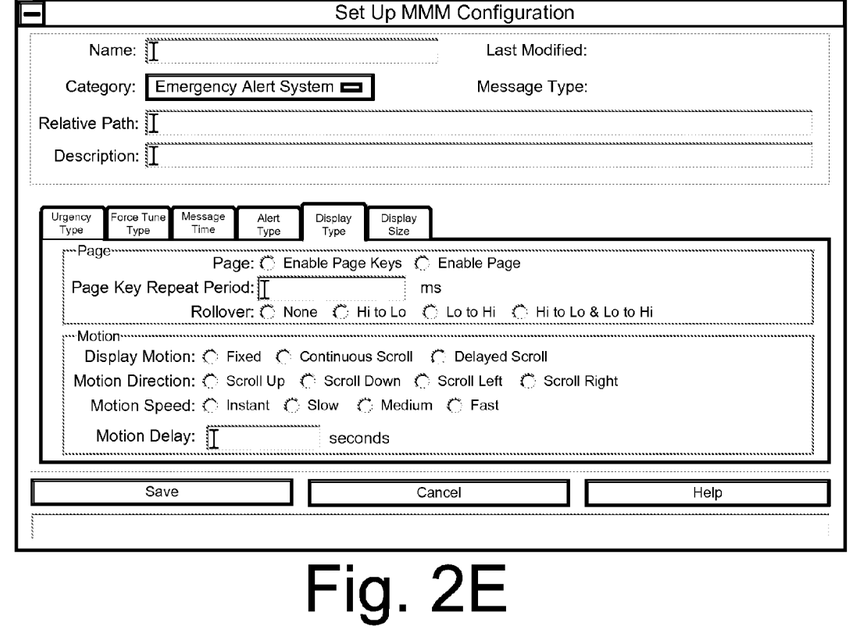
Figure 2F:
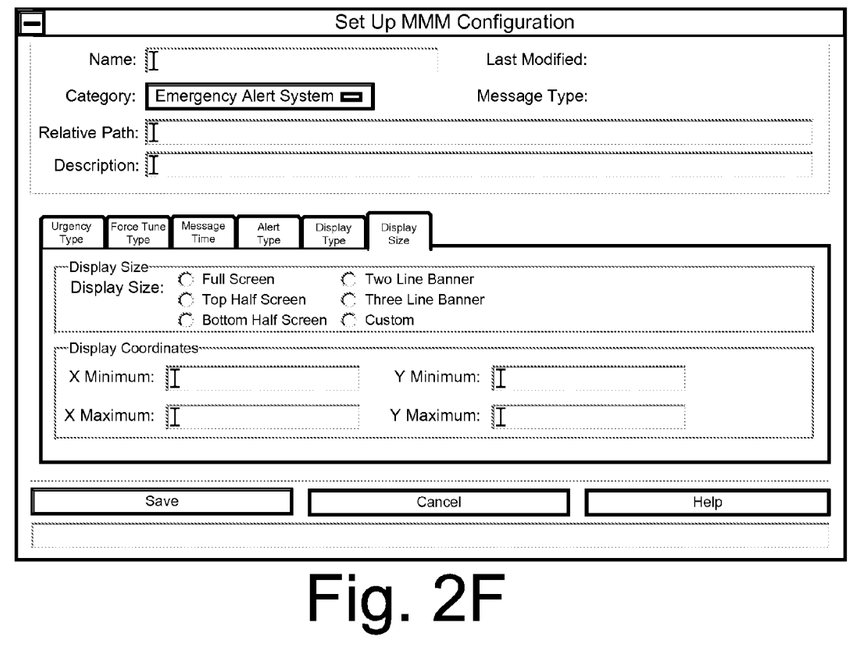

Exemplary set-up screens for creating an MMM configuration are provided in FIGS. 2A-2F. For example, FIG. 2A provides for the establishment of the urgency associated with the message, FIG. 2B provides for the establishment of a forced tune channel, FIG. 2C provides for the timing associated with the message (including duration, number of times repeated, delayed between repeats, and expiration day/time), FIG. 2D provides for the designation of the type of alert, FIG. 2E provides for the display type, and FIG. 2F provides for the display size.

Once a message configuration has been created using, for instance, the user interfaces of FIGS. 2A-2F, the message configuration can be added to sets of configurations which reside in data files stored in the message configuration database 24. Alternatively, a message configuration can be added to a data file available to the MMM client 12 via the BFS 26. One such file may be the default message configuration file residing on the BFS 26. The default message configuration file is automatically downloaded by the MMM client 12 upon boot of the communications terminal 18, and is updated when a file update notification message is received by the MMM client 12 from the MMM server 10, as described in greater detail below. Alternatively, one or more files containing one or more message configurations each may reside on the message configuration database 24 or BFS 26 for retrieval by the MMM client 12 upon request.

The default message configuration file may include one or more default configurations and is preferably automatically downloaded to the MMM client 12 upon boot of the communications terminal containing MMM client 12. An example of a suitable format for a message configuration file, such as the default message configuration file, is provided below in Table 1.

TABLE 1

| Byte | Field Name | Length (bits) | Range | Description |
| --- | --- | --- | --- | --- |
| 0...3 | Version | 32 | | This field indicates the version of this configuration file. |
| 4 | numConfigs(n) | 16 | | This field indicated how many configurations reside in this file. |
| | Index1 | 16 | | This field indicates the first configuration in this file in bytes from the top of the file. |
| | ... | ... | ... | |
| | Indexn | 16 | | This field indicates the offset of the last configuration file in bytes from the top of the file. |
| | Filler | 0 or 16 | | This field is a filler to cause the configuration data to start on a word boundary byte. |
| 4*x (word boundary) | <ConfigData1> | ... | ... | This field indicates the content of the first configuration. The format of this field is given in the previous table. |
| | ... | ... | ... | |
| 4*y (word boundary) | <ConfigData n> | ... | ... | This field indicates the content of the last configuration. The format of this field is given in the previous table. |

As evident from Table 1 above, multiple configurations may be packed into a single message configuration file, wherein the numConfigs field indicates the number of message configurations that are included in the message configuration file.

In accordance with an aspects of the present invention, an MMM request comprises message content provided by the service application server for delivery to the MMM client 12 and a message configuration expression. The message configuration expression may comprise the message configuration, and therefore, both the content and the associated message configuration are delivered to the MMM client 12 together over network 20. Alternatively, the message configuration expression may comprise a location reference, such as a uniform resource locator (URL), which can be utilized to locate the appropriate message configuration for presentation of the content delivered in the MMM request.

If the message configuration is not included within the MMM request, the message configuration may be stored locally at the MMM client 12, such as the case if the message configuration were included in the default message configuration download at boot of the communications terminal 18. Alternatively, the message configuration may reside remotely, such as in message configuration database 24 or BFS 26, and in which case the MMM client 12 retrieves the message configuration utilizing the location reference from the MMM request. Similarly, the message configuration may include a location reference to the message content, or a portion thereof, rather than the message content itself. This reference may take the form of a Uniform Resource Locator (URL) such as to a file on the BFS.

The MMM request is generated by the MMM server 10 in response to a request to send an MMM request by one of the service application servers. An illustrative format suitable for an MMM request generated by MMM server 10 is provided below in Table 2.

The displayFlag field controls the display of textual content provided in the MMM requests message. If the displayFlag field is df_None, then there is no visual content for the MMM message, implying that the message is merely an audio message. Under such circumstances, the content of the displayContent and displayOffset fields are not applicable. If the displayFlag field is df_HTML, then the displayed visual content is HTML encoded ASCII text, and is included in the <displayContent>. Further, the location of the display content is specified by the offset value in the displayOffset field. If the displayFlag field is df_ASCII, then the display content is ASCII text data. The ASCII text is stored in <displayContent> field pointed to by the displayOffset parameter. In this case, a default foreground, background, font, and size would be used to display the textual message. If the display flag is df_URL, then the display textual message is mounted in an URL location. The <displayContent> field will give the URL including path and file name. An illustrative format of the <displayContent> for df_URL is given below in Table 3.

TABLE 2

| Byte | Field Name | Length (bits) | Range | Description |
| --- | --- | --- | --- | --- |
| 0 . . . 3 | MsgId | 32 | | This field indicates which version of the configuration file should be used. |
| 4 | DisplayFlag | 4 | 0 . . . 4 | This field specifies the nature of displayContent and displayOffset fields.<br>0: df_None means that there is no text message and the content of the displayOffset and displayContent fields are not applicable. This is used when there is only an audio message.<br>1: df_Black means display a black screen and the content of the displayOffset and displayContent fields are not applicable.<br>2: df_HTML means the content of the displayContent field is an HTML file.<br>3: df_URL means that the content of the displayContent field is a URL location of an HTML file on the BFS server.<br>4: df_ASCII means that the content of the displayContent field is an ASCII file and a default foreground, background, font, and size will be used to display the message. |
| 4 | AudioFlag | 4 | 0 . . . 2 | This field specifies the nature of audioContent and audioOffset fields.<br>0: af_None means do not override the audio of the current service and the content of audioOffset and audioContent fields are not applicable.<br>1: af_Silence means play silence over the current application and the content of audioOffset and audioContent fields are not applicable.<br>2: af_URL means that the content of the audioContent field is the URL location of an audio file. |
| 5 | ConfigFlag | 1 | 0 . . . 1 | This field specifies the nature of configContent field.<br>0: cf_URL means the content of configContent is the name and URL of the configuration to be used with this MMM.<br>1: cf_Data means the content of configContent is the actual configuration data to be used with this MMM. |
| 5 | Reserved | 7 | 0 | |
| 6 . . . 7 | Display Offset | 16 | | This field specifies the offset of the displayContent field in bytes from top of this buffer. |
| 8 . . . 9 | AudioOffset | 16 | | This field specifies the offset of the audioContent field in bytes from the top of this buffer. |
| 10 . . . 11 | Reserved | 16 | 0 | |
| 12 . . . | <configContent> | . . . | | This field specifies either the actual configuration data or the name and URL location of the configuration depending on the option given in the configFlag field. |
| 4*n . . . (word boundary) | <displayContent> | . . . | | This field specifies either the actual HTML MMM or the URL location of the MMM depending on the option given in the displayFlag field. |
| 4*m . . . (word boundary) | <audioContent> | . . . | | This field specifies the URL location of the audio file if the option in audioFlag field is af_URL. If it is any other value this field has a length of zero and it is not applicable. |

TABLE 3

<displayContent> For df_URL

| Byte | Field Name | Length (bits) | Range | Description |
|---|---|---|---|---|
| 4*n... | URL | null terminated | | This field specifies the URL including path and filenames of the text file to be displayed for this MMM. |

The audioFlag field controls the audio data content in the MMM request. If the audioFlag field is af_None, then the MMM client 12 is not to override the audio with the current service, and therefore, the content of the audioContent and audioOffset fields are not applicable. If the audioFlag field is af_Silence, then the MMM client 12 is required to override the audio of the current service with silence, and in such a case the content of the audioContent and audioOffset fields also are not applicable. If the audioFlag field is af_URL, then the audio data is mounted in a URL location.

The audioContent field gives a NULL-terminated ASCII string indicating the URL location with path name and file name. An illustrative format of the audioContent for af_URL is provided below in Table 4.

TABLE 4

<audioContent> For af_URL

| Byte | Field Name | Length (bits) | Range | Description |
|---|---|---|---|---|
| 4*m... | URL | null terminated | | This field specifies the URL of the audio file to be played for this MMM. |

The configFlag field controls the configuration data content in the MMM request message. If the configFlag field is cf_Data, then the <configContent> field contains the actual configuration data to be used with the message. An illustrative format of the message configuration is provided below in Table 5.

<configContent> For cf_Data

| Byte | Field Name | Length (bits) | Range | Description | Release 1.1 |
|---|---|---|---|---|---|
| 0 | Priority | 4 | 0...15 | This field determines the priority of an MMM. | NA(0) |
| 0 | AcOutlet | 1 | 0...1 | This field determines whether to turn on the DHCTs when an MMM is arrived. 0: ao_Ignore causes no changes to the AC outlet. <Default> 1: ao_On turns on the DHCTs. | NA(0) |
| 0 | ForceTune | 1 | 0...1 | This field determines whether to activate a service Id defined in the forceTuneServiceId field. 0: ft_None means no changes in the current service and forceTuneServiceId field is not applicable. <Default> 1: ft_ServiceId means activate the service specified in forceTuneServiceId field. | |
| 0 | Immediacy | 1 | 0...1 | This field determines when an MMM should be activated/displayed. 0: imd_Immediate means activate the service Id or display message immediately upon arrival. If this option is selected, the triggerKey field is not applicable. 1: imd_KeyPress means that do not activate service Id or do not display the message until the user presses the trigger key defined by the triggerKey field. | NA(0) |
| 0 | Reserved | 1 | 0 | | |
| 1 | Repeats | 8 | | This field determines number of times which an MMM is repeated. | |
| 2...3 | ForceTuneServiceId | 16 | | This field determines the service ID to be activated when an MMM is arrived, if the option ft_ServiceId is selected in the forceTune field. | |
| 4...5 | DelayBetweenRepeats | 16 | | This field determines time in seconds between each MMM repetition. | |
| 6 | TriggerKey | 8 | 0x00-0x2E & 0x40 | This field determines the trigger key. 0x40 means any key. | NA (0x00) |
| 7 | EnablePageKeys | 1 | 0...1 | This field determines whether a page key can be used to page up and down through an MMM. 0: epk_No means disallow use of the page keys. 1: epk_Yes means allow use of page keys. | NA(0) |
| 7 | EnablePageMinus | 1 | 0...1 | This field determines whether a page - key can be used to go to the previous page. 0: ep_No means disallow use of the page - key. 1: ep_Yes means allow page - key | NA(0) |
| 7 | RollOver | 2 | 0...3 | This field determines whether the pages should be rolled over from hi to low and low to hi with the + key. 0: roll_None means do not roll from high to low | NA(0) |

| | | <configContent> For cf_Data | | | |
|---|---|---|---|---|---|
| Byte | Field Name | Length (bits) | Range | Description | Release 1.1 |
| 7 | DisplaySize | | 0 ... 15 | or low to high.<br>1: roll_HiToLow means allow rollover from hi to low but not from low to hi.<br>2: roll_LowToHi means allow rollover from low to hi but not from hi to low.<br>3: roll_Both means allow rollover from hi to low and low to hi.<br>This field specifies the size of display.<br>0: ds_FullScreen means full screen <NA><br>1: ds_1LineBottom means one line at the bottom. <NA><br>2: ds_2LineBottom means two line banner. <NA><br>3: ds_3LineBottom means three lines at the bottom.<br>4: ds_1LineTop means one line at the top. <NA><br>5: ds_2LineTop means two lines at the top. <NA><br>6: ds_3LineTop means three lines at the top.<br>7: ds_TopHalfScreen means top half screen. <NA><br>8: ds_BottomHalfScreen means bottom half screen. <NA><br>9: ds_CenterScreen means center part of the screen. <NA><br>10: ds_Custom allows the user to specify their coordinates in the displayCoords fields. <NA> | NA(3) |
| 8 | DisplayMotion | 2 | 0 ... 2 | This field specifies the motion of the text.<br>0: dm_Fixed means no motion. <Default><br>1: dm_ContinuousScroll means scroll the entire textual message using the motionDirection and motionSpeed fields.<br>2: dm_DelayedScroll means scroll the textual message in pieces, using the motionDirection, motionSpeed, and motionDelay fields. <NA> | NA(0) |
| 8 | MotionDirection | 2 | 0 ... 3 | This field specifies direction of scrolling.<br>0: md_ScrollUp means scroll up.<br>1: md_ScrollDown means scroll down. <NA><br>2: md_ScrollLeft means scroll left.<br>3: md_ScrollRight means scroll right. <NA> | NA(0) |
| 8 | MotionSpeed | 2 | 0 ... 3 | This field specifies speed of scrolling.<br>0: ms_Instant doesn't actually scroll but rather replaces (only valid with dm_DelayedScroll);<br>1: ms_Slow<br>2: ms_Medium<br>3: ms_Fast | |
| 8 | Reserved | 2 | 0 | | |
| 9 | Reserved | 8 | 0 | | |
| 10 ... 11 | MotionDelay | 16 | | delay in seconds between scrolling of message pieces during dm_DelayedScroll. | NA(0) |
| 12 ... 13 | PageKeyRepeatPeriod | 16 | | This field determines time in milliseconds between page changes with a page key held down. | NA(0) |
| 14 ... 15 | DisplayCoordsXMin | 16 | | x min display window on screen. | NA(0) |
| 16 ... 17 | DisplayCoordsYMin | 16 | | y min display window on screen. | NA(0) |
| 18 ... 19 | DisplayCoordsXMax | 16 | | x max. display window on screen. | NA(0) |
| 20 ... 21 | DisplayCoordsYMax | 16 | | y max. display window on screen. | NA(0) |
| 22 | Reserved | 4 | | | |
| 22 | MessageAlert | 4 | 0 ... 5 | This field determines how a subscriber is notified when an MMM is arrived:<br>0: ma_None means no alert is given;<br>1: ma_Text means text defined in the alertContent field is displayed and use a default set of foreground, background, size, and font.<br>2: ma_Light means that message LED will be turned on;<br>3: ma_HTML means display the HTML file defined in the alertContent field.<br>4: ma_Tboth means display both alertContent field and message LED; and the content of the alertContent is an ASCII file and use default background, foreground, size, and font.<br>5: ma_Hboth means display both alertContent | NA(0) |

-continued

<configContent> For cf_Data

| Byte | Field Name | Length (bits) | Range | Description | Release 1.1 |
|---|---|---|---|---|---|
| | | | | field and message LED; and the content of the alertContent is an HTML. | |
| 23 | AlertLEDRate | 8 | | This field determines the rate of LED blinking in cycles per second. This field is only applicable for the options of ma_Light, ma_HBoth and ma_TBoth in the messageAlert field. | NA |
| 24 | AlertLEDDuration | 8 | | This field determines the length in seconds of the interval during which blinking occurs. This field is only applicable for the options of ma_Light, ma_HBoth and ma_TBoth in the messageAlert field. | NA |
| 25 | AlertLEDPeriod | 8 | | This field determines how often in seconds the blinking interval is repeated. This field is only applicable for the options of ma_Light, ma_HBoth and ma_TBoth in the messageAlert field. | NA |
| 26 . . . 27 | AlertLength | 16 | | This field determines the length of the alertText field. | NA(0) |
| 28 . . . 2 | Reserved | 16 | | | |
| 30 . . . | AlertContent | . . . | | This field determines a 2-line text if the messageAlert field is either ma_Text, ma_HTML, ma_TBoth, or ma_HBoth. | NA |

Of particular interest, the messagealert field may define modes of notification, some of which are operable when the communications terminal 18 is turned off and the same and/or others when the terminal 18 is turned off. If the terminal 18 is off, then one of the modes of alert may be to force the terminal 18 on and then a visual and/or audio message is played. Regardless of the mode, there are essentially three sources of the data for the alert, such as an animated clip for play on a display device at a single location, multiple location, or moving. The data may be stored locally, received with the MMM request, or retrieved from an identified location (such as with a URL).

If the configFlag field is cf_URL, then the <configContent> field specifies the name and URL location of the configuration data file which includes the message configuration to be used with this message. An illustrative format of this <configContent> is provided below in Table 6.

TABLE 6

<configContent> For cf_URL

| Byte | Field Name | Length (bits) | Range | Description |
|---|---|---|---|---|
| 12 . . . | Name null terminated | | | This field specifies the configuration to be used with this MMM. |
| . . . | URL null terminated | | | This field specifies the URL of the configuration file to be used with this MMM. |

The URL field includes the path and file name specifying the location of the message configuration file. The Name field indicates the configuration data content to be used with the message. Thus, one or both of the configFlag field and the <configContent> comprise the message configuration expression.

Once the MMM request has been generated by the MMM server 10, it is delivered over the network 20 to the communications terminal 18. This may be achieved by physically sending a message using the facilities of the cable or satellite system. In the present embodiment this is mechanism uses the DSM-CC User-to-Network Pass-Thru Messaging standard based on the MPEG-2 standard. Alternatively, an MMM request may be defined and delivered using the service management facilities of the cable or satellite system. In an exemplary embodiment, a service includes an application and a parameter, as discussed in U.S. patent application Ser. Nos. 09/025,577 and 09/071,550, which are cited above. Other System Information standards include ATSC SI (A/56 and A/65), SCTE DVS-234, and the applicable DVB standard. For MMM, a service consists of the MMM client 12 as the application and the MMM requests as the parameter. This service can be assigned to a channel and activated when the user tunes the communications terminal 18 to that channel.

Figure 3:
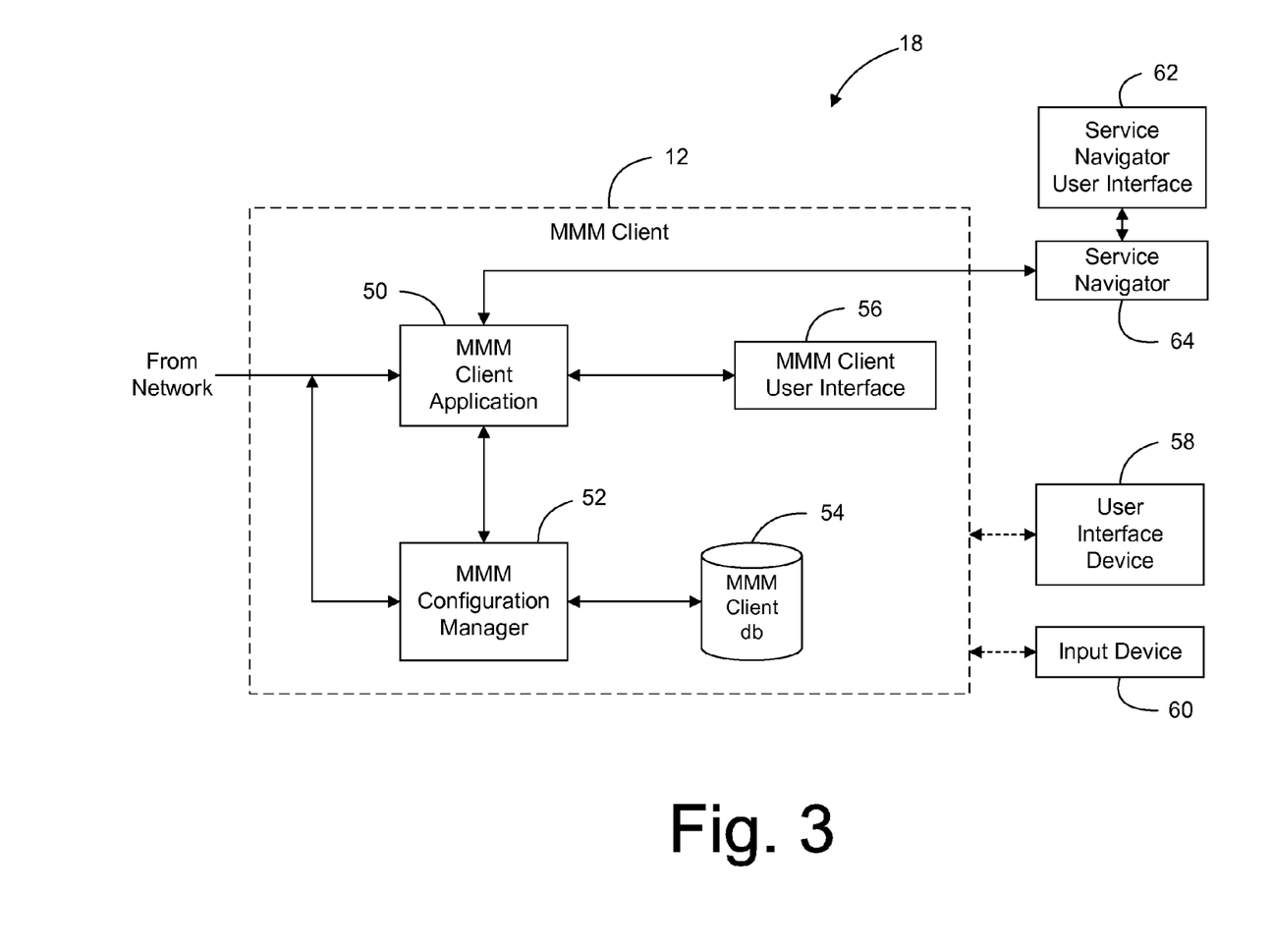
FIG. 3 is a block diagram of a communication terminal in accordance with an embodiment of the present invention.

With reference to FIG. 3, an MMM client 12 in accordance with an embodiment of the present invention as illustrated. The MMM client 12 is configured to process MMM request and MMM configuration updates. The MMM client 12 comprises an MMM client application 50, an MMM configuration manager 52, an MMM client database 54, and an MMM client user interface 56. In addition, associated with the communications terminal 18 is a user interface device 58 which may include a display device, speakers, or other devices suitable for delivery of the message content to the subscriber. An input device 60 is provided for delivering user inputs to the communication terminal 18, and more particularly, to the MMM client 12.

The MMM client application 50 receives and processes the MMM configuration update requests and MMM requests. When an MMM configuration update message is received from an MMM server 10, the MMM client application 50 decides whether or not to load the new message configuration data based on the version number provided. If the MMM client application 50 decides to update the default message configuration, then they will read the file from the BFS 26 and delivers the data to the MMM configuration manager 52. In addition, the MMM client application 50 may retrieve message content data such as audio files or text files from the BFS 26 as necessary to fulfill the request of the MMM request.

When an MMM request is received, the MMM client application 50 is activated and any MMM request data (e.g., message configuration and/or message content) associated with the MMM request but not included with the MMM request is retrieved, such as audio content or message configuration content from the BFS 26. The MMM request data is then parsed and processed by the MMM client application 50. If the MMM request is a forced tune message, i.e., an EAN message, then the MMM client 12 will save and suspend the currently viewed service, and activate a new service according to the service ID provided by the MMM request. The forced tune message preferably can only be terminated by a termination message sent by the MMM server 10, or by turning off the communication terminal 18.

The MMM configuration manager 52 manages the default message configuration file downloaded at boot and the message configuration data downloaded with the MMM request or otherwise retrieved in response to an MMM request. The MMM configuration manager 52 also tracks the latest version of the default configuration file residing in the MMM client database 54. In the MMM client database 54, the MMM configuration manager 52 stores MMM configuration files downloaded during operation. The MMM configuration manager 52 retrieves the configuration files when appropriate for use by the MMM client application 50. As discussed above, the default configuration files can be downloaded at boot from the BFS 26 or they can be downloaded directly to the MMM configuration manager 52, while configuration files received as a part of an MMM request are provided to the MMM configuration manager 52 via the MMM client application 50.

While the MMM request typically comes from the MMM server 10, an MMM request can be generated from other sources within the system 8. For example, an MMM request can be generated when the subscriber tunes a channel using the resident service navigator that provides a service navigation user interface 62, which issues a request for service to the service navigator 64. The service navigator 64 then generates an MMM request that is sent to the MMM client 12 where it is processed in substantially the same manner as an MMM request from the MMM server 10, as described above.

Accordingly, as an MMM request is received by the MMM client application 50, the MMM client application 50 parses the MMM request, retrieving the display, audio, message configuration data, for example, off the BFS 26 if not included directly with the MMM request. The parameters of the message configuration are examined to determine which display and audio components are necessary for presentation of the multimedia message. Depending on the MMM configuration, the user may be notified visually or audibly of the message arrival. The user may actually have to trigger the message presentation, depending upon the message configuration. The relevant visual and audio content is then passed to the display and audio components of the interface device 58 so that the subscriber is presented with the multimedia message.

As previously mentioned, the MMM configurations define the presentation of the message to the user via the user interface device 58. While these parameters are defined by an MMM configuration, one or more of the parameters may be overridden by parameter preferences included in the request or by a client profile, which is a user defined selection of parameters that are preferred by the user. For example, a client profile may define that text messages be presented as a ticker tape and all audio messages be accompanied by an illuminated LED. Preferably, the parameter preference of the client profile are defined based on the message type and priority. The parameters of the client profile, which is preferably stored locally to the MMM client 12, is executed by the MMM client application 50, and may override the parameters from the designated MMM configuration or from the MMM request. This provides user customized notification and presentation of a message.

Figure 4:
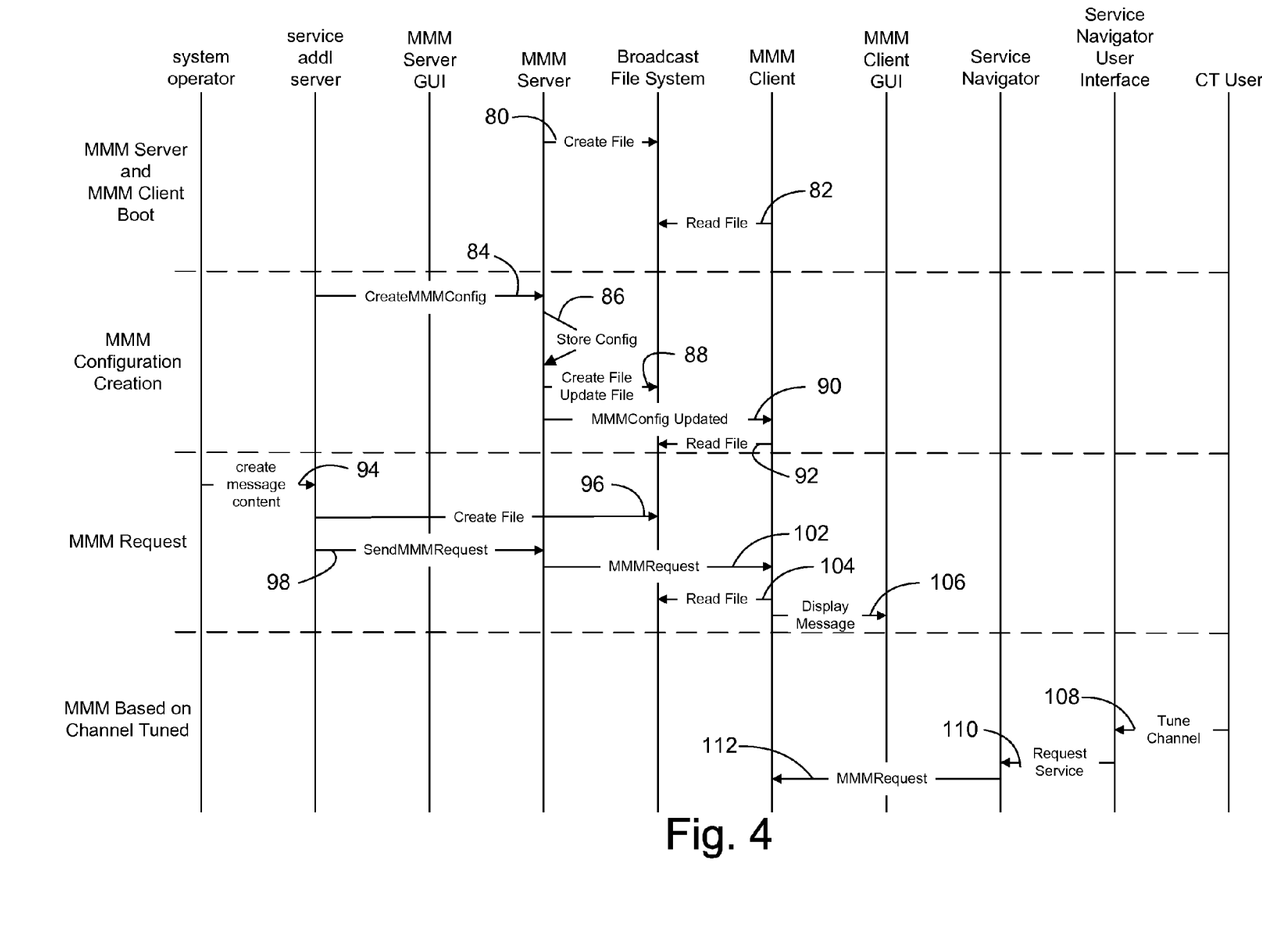
FIG. 4 is a data flow diagram illustrating the operation of a multimedia messaging system in accordance with an embodiment of the present invention.

With reference to FIG. 4, the operation under several scenarios of an MMM system in accordance with an embodiment of the present invention is provided. For example, the default message configuration file is created with all of the designated default message configurations and placed on the BFS 26 during the boot of the MMM server 10, as indicated by CreateFile step 80. When the communication terminal 18 boots the MMM client reads the default message configuration file from the BFS 26, as indicated by the ReadFile step 82.

The creation of a message configuration can be initiated by an operator at a service application server or the operator can create an message configuration via the MMM server user interface 22. When the message configuration is defined, it is sent to the MMM configuration database 24 via the MMM server 10, as indicated by the CreateMMMConfig step 84 and StoreConfig step 86. Alternatively, the new message configuration file may be placed on the BFS 26 for retrieval by the MMM client 12, as indicated by the CreateFile step 88. Once the message configuration file is updated, the MMM server 10 sends the updated configuration file to the appropriate locations, such as the BSF 26. A notification is sent to the MMM client 12 notifying the MMM client that a message configuration has been updated, as indicated by MMMConfigUpdate step 90. In response, the MMM client 12 determines if the updated message configuration should be downloaded, and if so, then reads the updated message configuration from the BFS 26, as indicated by ReadFile step 92.

When a system operator or a service application server wishes to send a message, the message content is created if not already in existence. This may involve the creation of HTML, audio content, or simple text, all of which may be stored as files on the BFS 26, as indicated by the CreateMessageContent step 94 and CreateFile step 96. Once the content is created, an MMM request is created by the MMM server 10 to send the message (i.e., the content) using a defined message configuration. This is done by a SendMMMRequest to the MMM server 10, as indicated by the SendMMMRequest step 98. If the specified message configuration of the MMM request is not available on the BSF 26 or in the local default message configuration file, then the MMM server can include the configuration data in the MMM request message that is delivered over the network 20 to the MMM client 12, as indicated by MMMRequest step 102. When the MMM client 12 receives the MMM request, the MMM client 12 may need to load the MMM configuration and/or content such as from the BSF 20, as indicated by the ReadFile step 104. The MMM client then processes the message according to the message configuration for presentation via the user interface device 58, as indicated by Display Message step 106.

An MMM request can also be based on a communication initiated by the subscriber selecting a channel which provides an already defined MMM service, as indicated by the TuneChannel step 108 and RequestService step 110. In this case, the MMM request comes from the service navigator 62, as indicated by MMM request 112. The MMM client then process the MMM request in substantially the same way as an MMM request from the MMM server 10, and discussed above.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A system for providing customizable multimedia messages over a television system to a communications terminal for presentation to a user, comprising:
   a plurality of application servers that each generate a message configuration that defines a presentation format for an associated message content, the presentation format unique to each of the plurality of application servers, each of the plurality of application servers being capable of providing interactive services that enable a communications terminal to communicate over the television system;
   a carousel file server system;
   a multimedia messaging client application located in the communications terminal; and
   a multimedia messaging server coupled to the carousel file server system, the multimedia messaging server configured to receive the message configuration from each of the plurality of application servers and associate the associated message content for presentation to a user according to the message configuration, the multimedia messaging server configured to generate a request on behalf of each of the plurality of application servers according to the message configuration, the request including a reference to a location of the message content located on the carousel file server system and a reference to a location of the message configuration on the carousel file server system, wherein the plurality of application servers, the carousel file server system, and the multimedia messaging server are located in a headend, the multimedia messaging server being capable of managing the delivery of the request over the television system to the communications terminal, thereby conserving system bandwidth,
   wherein, upon receiving the request, the multimedia messaging client application retrieves the message content and the message configuration at the referenced locations of the carousel file server system and associates the message content and the message configuration for presentation of the message content according to the message configuration.

2. The system of claim 1, wherein at least one of the plurality of application servers comprises an emergency alert system server.

3. The system of claim 2, wherein the plurality of application servers comprises one or more of a virtual channel system server, a messaging service server, and a business application support service server.

4. The system of claim 3, further comprising an additional application server communicatively coupled to the multimedia messaging client, the additional application server comprising an email server located remotely from the headend.

* * * * *